(12) United States Patent
Christiansen

(10) Patent No.: US 7,202,964 B2
(45) Date of Patent: Apr. 10, 2007

(54) DETERMINING RASTER IMAGE PROCESSOR CYCLE COUNT TO FULLY UTILIZE A PRINTER

(75) Inventor: Robert Douglas Christiansen, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 961 days.

(21) Appl. No.: 10/192,226

(22) Filed: Jul. 10, 2002

(65) Prior Publication Data

US 2004/0008359 A1 Jan. 15, 2004

(51) Int. Cl.
*G06F 3/12* (2006.01)

(52) U.S. Cl. .............. 358/1.15; 358/444; 358/445; 358/530; 358/546; 358/502; 358/1.18; 358/403; 345/520; 709/201

(58) Field of Classification Search ............... 358/403, 358/444–445, 530, 546, 502, 1.18, 1.15; 345/520; 709/201
See application file for complete search history.

(56) References Cited

U.S. PATENT DOCUMENTS

| | | | | |
|---|---|---|---|---|
| 5,594,860 A | * | 1/1997 | Gauthier | 345/543 |
| 6,295,134 B1 | * | 9/2001 | Hughes | 358/1.13 |
| 6,327,050 B1 | * | 12/2001 | Motamed et al. | 358/1.18 |
| 6,462,830 B1 | * | 10/2002 | Negishi | 358/1.12 |
| 6,559,958 B2 | * | 5/2003 | Motamed et al. | 358/1.13 |
| 6,762,855 B1 | * | 7/2004 | Goldberg et al. | 358/1.5 |
| 6,816,276 B2 | * | 11/2004 | Sugano | 358/1.15 |
| 6,825,943 B1 | * | 11/2004 | Barry et al. | 358/1.15 |
| 6,891,632 B2 | * | 5/2005 | Schwartz | 358/1.15 |
| 6,930,795 B1 | * | 8/2005 | Motamed et al. | 358/1.18 |
| 6,989,908 B1 | * | 1/2006 | Ito | 358/1.15 |
| 7,016,061 B1 | * | 3/2006 | Hewitt | 358/1.15 |

* cited by examiner

*Primary Examiner*—Twyler Lamb
*Assistant Examiner*—Robert N. Kang

(57) ABSTRACT

Commercial printers operate more efficiently when they run continuously after being started on a print job. Print job image data is processed by a predetermined number of raster image processors (RIP engines) before starting a printer so as to be able to operate a printer continuously for the duration of the print job. Print job partitions are determined and counted. A predetermined number of partitions are processed into hardware ready bit (HRB) output files which are transferred to the printer. Using a predetermined formula, the total number of partitions to process is calculated before sending resultant HRB output files to said printer. Remaining partitions are processed into HRB files by at least one of the RIP engines until all partitions have been processed.

17 Claims, 5 Drawing Sheets

FIG. 5

Top table (N=3)

| P(t) |  | 0 | 82 | 164 | 246 | 328 | 410 |
|---|---|---|---|---|---|---|---|
| R(t) |  | 180 | 240 | 300 | 360 | 420 | 480 |
| t=0 | 169 | 220 | 293 | 366 | 439 | 512 | 585 |
| DOWNLOAD INPUT FILE TO EACH RIP ENGINE'S SYSTEM $F_s * R_c / N_t =$ 12*3/35 =1sec N=3 | RIP 3 CYCLES (3 PARTNS ON EACH RIP ENGINE). $N * P_c * R_b =$ 3*20*2.8 = 168 SECONDS | TRANSFER 60 PAGES FROM EACH RIP ENGINE(180 PAGES TOTAL). $N * P_c * R_c / P_o / N_t =$ 3*20*3*10 /35=51 SEC | RIP AND TRANSFER ONE CYCLE RIP=56 SEC XFER=17 SEC 73 SEC TOTAL PRINT=73* 1.13=82 PAGES PRINTED | RIP AND TRANSFER ONE CYCLE RIP=56 SEC XFER=17 SEC 73 SEC TOTAL PRINT=73* 1.13=82 PAGES PRINTED | RIP AND TRANSFER ONE CYCLE RIP=56 SEC XFER=17 SEC 73 SEC TOTAL PRINT=73* 1.13=82 PAGES PRINTED | RIP AND TRANSFER ONE CYCLE RIP=56 SEC XFER=17 SEC 73 SEC TOTAL PRINT=73* 1.13=82 PAGES PRINTED | RIP REMAINING PAGES/LESS THAN A FULL CYCLE SINCE ONLY 468 PAGES IN THE PRINT JOB SHOWING THAT AN INITIAL RIP CYCLE (N) VALUE OF 3 IS SUFFICIENT TO KEEP THE PRESS CONTINUALLY RUNNING FOR A 486 PAGES INPUT JOB. |

Bottom table (N=2)

| P(t) |  | 0 | 82 | 164 | 246 | 328 | 410 | 492 |
|---|---|---|---|---|---|---|---|---|
| R(t) |  | 120 | 180 | 240 | 300 | 360 | 420 | 480 |
| t=0 | 113 | 147 | 220 | 293 | 366 | 439 | 512 | 585 |
| DOWNLOAD THE INPUT FILE TO EACH RIP ENGINE'S SYSTEM $F_s * R_c / N_t =$ 12*3/35 =1sec N=2 | RIP 2 CYCLES (2 PARTNS ON EACH RIP ENGINE). $N * P_c * R_b =$ 2*20*2.8 = 112 SECONDS | TRANSFER 40 PAGES FROM EACH RIP ENGINE(120 PAGES TOTAL). $N * P_c * R_c / P_o / N_t =$ 2*20*3*10 /35=34 SEC | RIP AND TRANSFER A SINGLE CYCLE RIP=56 SEC XFER=17 SEC 73 SEC TOTAL PRINT=73* 1.13=82 PAGES PRINTED | RIP AND TRANSFER A SINGLE CYCLE RIP=56 SEC XFER=17 SEC 73 SEC TOTAL PRINT=73* 1.13=82 PAGES PRINTED | RIP AND TRANSFER A SINGLE CYCLE RIP=56 SEC XFER=17 SEC 73 SEC TOTAL PRINT=73* 1.13=82 PAGES PRINTED | RIP AND TRANSFER A SINGLE CYCLE RIP=56 SEC XFER=17 SEC 73 SEC TOTAL PRINT=73* 1.13=82 PAGES PRINTED | RIP AND TRANSFER A SINGLE CYCLE RIP=56 SEC XFER=17 SEC 73 SEC TOTAL PRINT=73* 1.13=82 PAGES PRINTED | BEFORE THE LAST RIP PARTITIONS WERE DELIVERED TO THE PRESS, THE PRESS RAN OUT OF DATA TO PRINT. SHOWING THAT AN INITIAL RIP CYCLE (N) VALUE OF 2 IS INSUFFICIENT TO KEEP THE PRESS CONTINUALLY RUNNING FOR A 468 PAGE INPUT JOB. |

FIG. 5

DETERMINING RASTER IMAGE PROCESSOR CYCLE COUNT TO FULLY UTILIZE A PRINTER

BACKGROUND OF THE INVENTION

In a printing system, such as those employing laser printers, ink jet printers or large commercial size offset printers, data representing an image to be printed (from an application such as a word processor or graphics program) must be converted to a raster format for the print engine (the electronic circuitry controlling the mechanical printing hardware) of a printer. The raster-format print data instructs the print engine where to deposit marking agents such as, but not limited to, ink or toner that form individual picture elements of a printed page, onto the print media. The locations where toner droplets are to be placed onto a media are usually referred to as picture elements, pixels or "pels."

Laser printers, ink jet printers and commercial offset printers, typically include a rendering system in the printer which accepts output from a content-generating program such as WORD®, Photoshop® and others and generates a data set that the printer can understand and from which a page can be printed. A rendering system includes a combination of hardware and software to accomplish the rendering task which is commonly referred to as raster image processing or "RIPping."

Printing an image or page from a content-generating program or other source begins with the creation of a digital image data file, referred to as a "print job." A printer driver is used to convert the digital image file into a page description language (PDL) file using well-known techniques in the art. The PDL file is transmitted to either a printer buffer or to a separate raster image processor and then to the printer.

Several operations are performed on the PDL file including, but not limited to: compression, decompression, color space conversion, half-toning and formatting. The various processing operations can be performed using software or hardware, including a suitably programmed processor within the printer or by an external raster image processor.

If raster image processing is performed within a printer, the printer formatter receives the receives the PDL file and RIPs (i.e., converts) it to a format acceptable to the print engine. In the case of a laser printer, a corresponding electronic image is formed on the photo conductor drum, which is subsequently transferred to the print media to form a printed hard copy output page. The printer formatter is designed to convert most PDL print jobs to a required format at a rate sufficiently high so as to allow the printer to run at a rated speed.

Complex print jobs, including those performed by large commercial-size printers, require significant processing time thereby reducing the rate at which data can be transferred to the print engine, resulting in reduced output page printing rates. In a commercial printing environment, where print production volume is of paramount importance, it is important to run a commercial printing press at its maximum capacity.

One approach to address the RIP bottle neck is to perform the RIP tasks at the host computer, the processors of which are typically much more robust than the processors within a printer. A problem with burdening a host processor with the task of RIPping a print job however is that the host processor thereafter suffers a performance degradation during the course of RIPping a print job.

For these and other reasons, there is a need for the present invention.

BRIEF DESCRIPTION OF THE DRAWINGS

The accompanying drawings are included to provide a further understanding of the present invention and illustrate a preferred embodiment thereof.

FIG. 5 depicts a timing diagram showing the flow of activity between the RIP engines and the printing press for an exemplary print job according to the embodiment shown in FIG. 1.

DETAILED DESCRIPTION OF A PREFERRED EMBODIMENT

As shown in the accompanying drawings, the present invention is embodied in a method and apparatus which determines on a job-by-job basis, or on a page-by-page basis, the minimum number of raster image processor (RIP) cycles to be completed by one or more raster image processors prior to actually starting a printing operation in order to keep a printer running continuously (or nearly continuously) for the duration of a print job. A "RIP cycle" is considered to be the time required for one or more raster image processors to convert at least part of an entire print file, (e.g., a PDF file) into hardware ready bits (HRBs) needed by the printer to print a single page of the file. In many commercial printing devices, once a printer or printer press starts to work on a job, hardware ready data bits need to be made continuously available to the printer until the entire print job has completed printing. A printer or printing press "starves" (and must be stopped) when hardware ready bits are not available. Accordingly, a sufficient number of hardware ready bits need to be generated by RIPping at least part of a print job before starting to print it.

The amount of RIPping that should be done before starting a print job involves calculating the amount of hardware ready bits to generate before starting a printer in order to keep the printer running for the entire duration of the job. The amount of RIPping that needs to be done before starting a print job and that are required to be RIPped, needs to account for the time required for the press to process any queued-up hardware ready bits because additional hardware ready bits can continue to be generated during the time that the printer is processing any available hardware ready bits.

Figure 1:
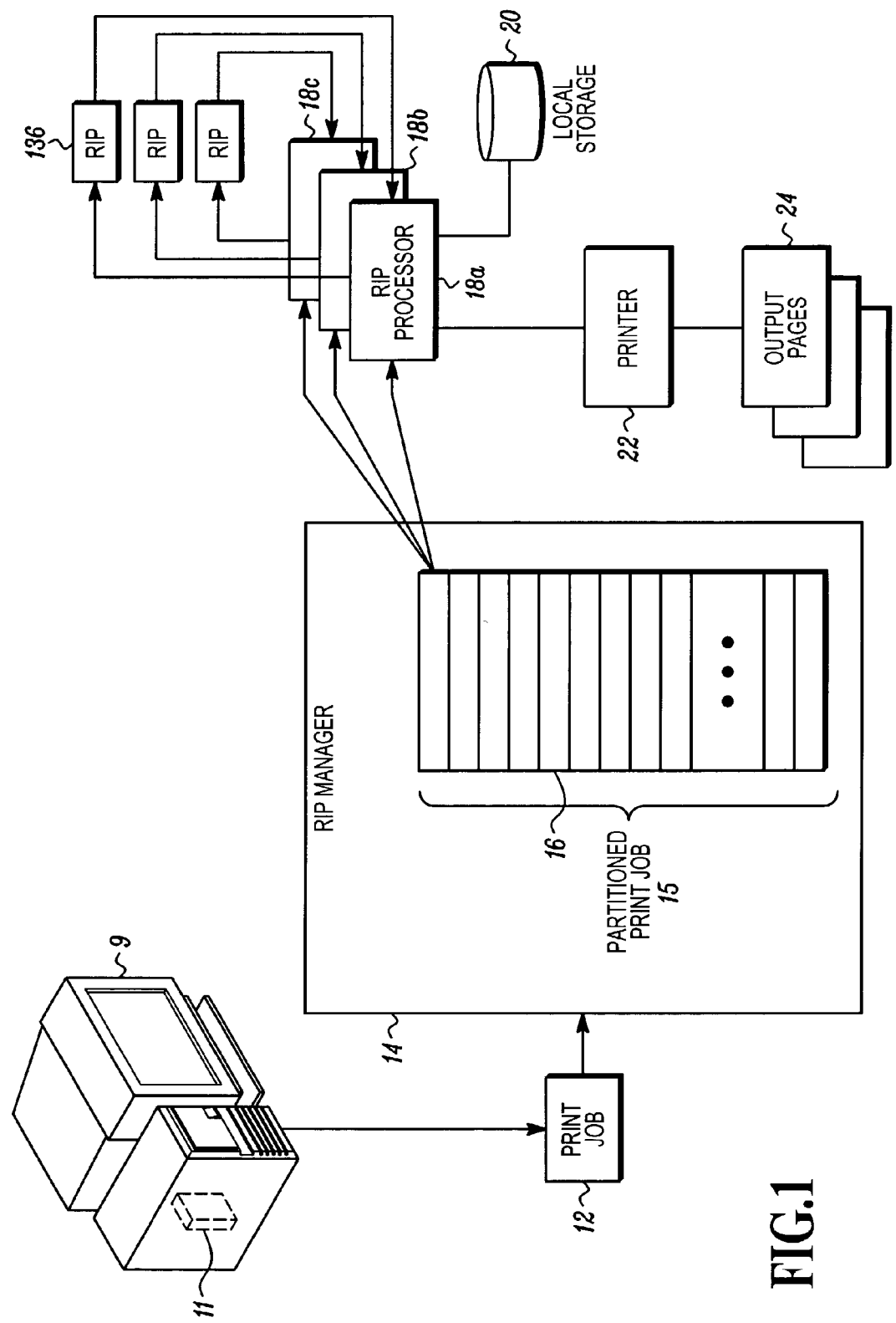
FIG. 1 is a conceptual schematic block diagram of a printing system having multiple raster image processors to process a print file according to an embodiment of the present invention.

In FIG. 1, a print job 12 is typically comprised of a digital image data file already converted to a page description language file using well-known techniques. Examples of image files would include the output files of virtually any word processing or drawing application 11 (running on a computer 9) from which a printed page can be generated. Accordingly, the print job 12 in the system depicted in FIG. 1 is a page description language file.

The print job 12 is sent to a raster image processor manager 14 for further processing. In the preferred embodiment, the RIP manager 14 is embodied as a computer program (i.e., software) resident on one or more processors that receive the page description language file (print job) 12 and performs a series of operations on the print job 12 as set forth hereinafter. The RIP manager software 14 can reside on a computer or computers that are physically proximate to the printer 22 but might also be one or more computers accessible via a network such as the Internet, a local area network or an Intranet. Those of ordinary skill in the computer science and electronic printing and publishing arts will recognize that alternate and equivalent embodiments include a RIP manager 14 that is embodied as both one or more processors and software for the processor(s) that receives a PDL file and performs operations on the PDL file.

A function of the RIP manager 14 is to process the print job 12 yielding a partitioned print job 15. Print job partitions 16 are portions of the print job 12 and can be thought of as (but are not necessarily identical to) one or more individual pages to be printed from the printer 22 after the partitions 16 are raster image processed (RIPped) by the raster image processors 18A, 18B and 18C.

The raster image processors 18A–C depicted in FIG. 1 accept individual partitions 16 of a print job 12 from the RIP manager 14 and create output binary files known as hardware ready bit files ("HRB files") which can be sent directly to the printer 22 or to a local storage device 20 for later retrieval and printing as one or more output pages 24. When an HRB output file is sent to the printer 22, the printer 22 can take the HRB file and from it, print one or more output pages 24 corresponding to the associated partition 16 onto print media, yielding the print image created by the application program 11. The output pages 24 comprise the result of the print job 12.

A problem with keeping commercial-size printers running at full capacity is the time required to RIP a print job. Once a printing press begins printing, a sufficient amount of hardware ready data needs to be continuously available to the printer, until an entire print job has completed. Without sufficient data, the printing press will starve and need to be stopped. Stopping a printer causes a number of practical problems including print set up, and may also result in revenue loss.

By RIPping a number of job partitions 16 in advance of starting the printing press (a process step of which is identified in FIG. 2 as step 136, which is also depicted in FIG. 1), it is possible to keep a printer 22 busy while the printer 22 prints pre-RIPped partitions as the RIP engines 18 continue working on other print partitions 16 such that the printer 22 can be kept continuously printing from start to finish. Determining the optimum number of print job partitions 16 that need to be RIPped in advance of starting the printing press is not trivial.

Figure 2:
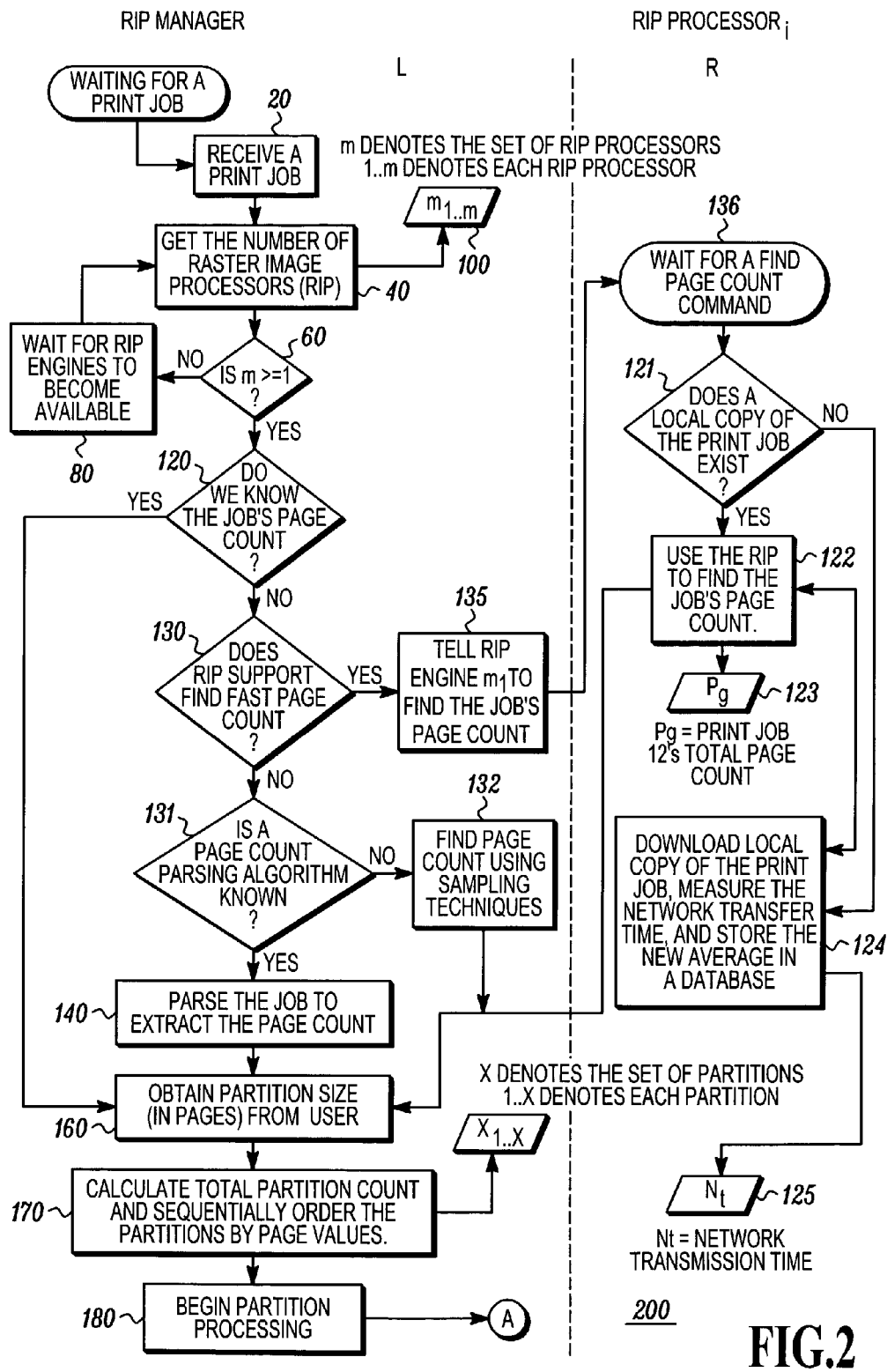
FIG. 2 is a process flow diagram of an embodiment of a method for practicing the present invention.
Figure 3:
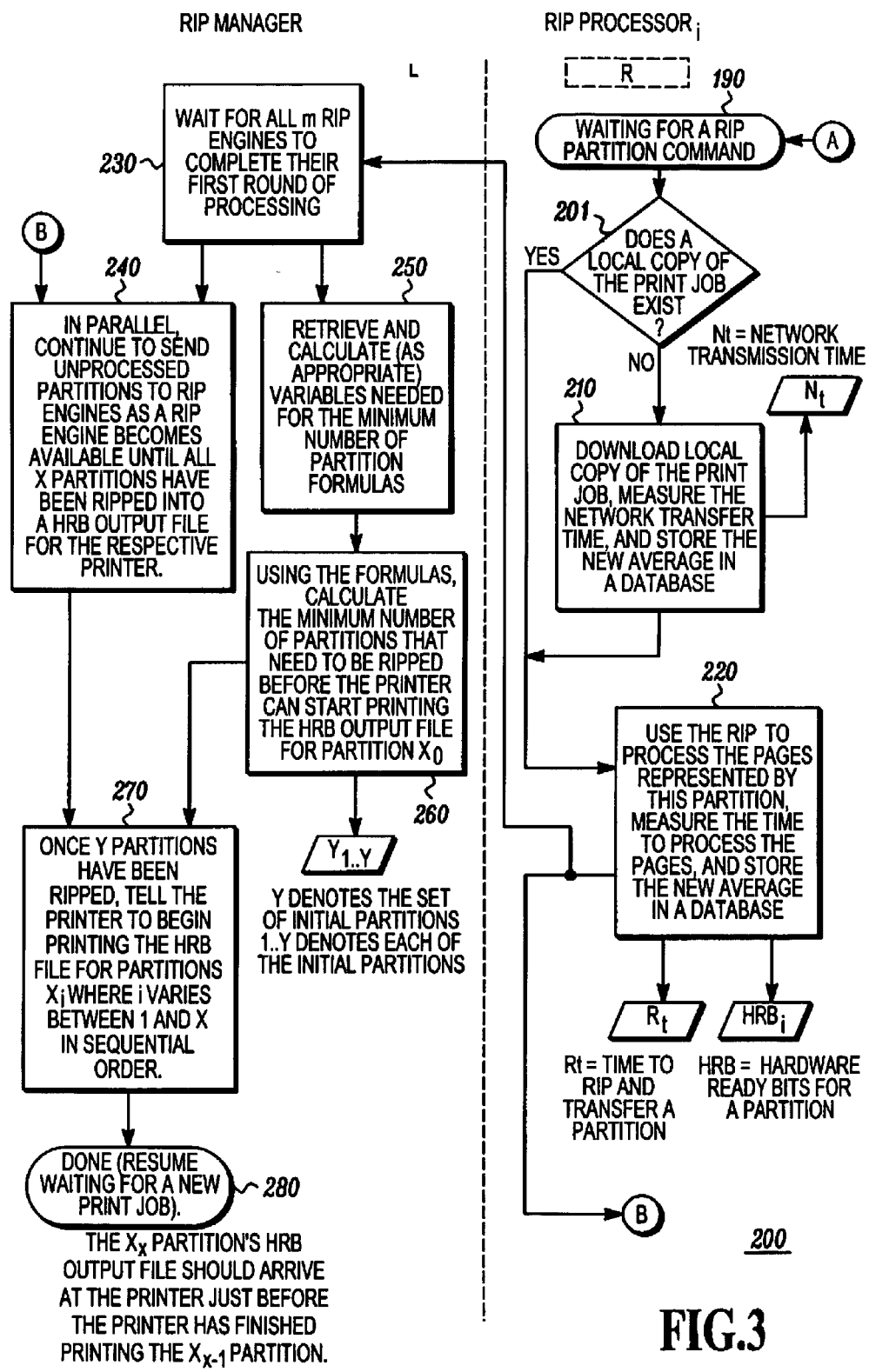
FIG. 3 is a continuation of the process flow diagram depicted in FIG. 2.

FIGS. 2 and 3 depict the steps of the method 200 for processing a print job 12 for a printer 22 using multiple raster image processors 18. The steps of the method depicted in FIGS. 2 and 3 are preferably performed by one or more appropriately programmed computers that execute program instructions stored in memory devices and media that includes semiconductor RAM, ROM, magnetic or optical disks. Media in which computer program instructions can be stored and retrieved for execution is not shown in the figures for clarity but such devices are well known to those of ordinary skill in the computer arts.

In the preferred embodiment, method steps shown on the left-hand side (L) of FIGS. 2 and 3 are performed by the RIP manager 14 whereas method steps on the right-hand side (R) of the figures are performed by one or more raster image processors 18.

The method 200 is performed by the RIP manager 14 receiving a print job at step 20 in FIG. 2. The "print job" is considered to be a PDL file but also including other files output from programs such as WORD® or PHOTOSHOP®. The step of "receiving a print job" is performed by the computer or other processor that converts the PDL file into the aforementioned partitions. "Receiving a print job" means physically receiving data such as by way of a data network (Intranet or Internet) or via a physical media transfer, e.g., a magnetic tape; CDROM; magnetic disk. The processing of a print job does not need to be performed by a single computer but could also be performed by a number of different computers.

Once the print job is received, the RIP manager 14 determines the number of raster image processors (RIP) 18 in step 40 so as to determine how many RIPs 18 are available for passing the print job and its partitions out to for completion. In step 60, if there are no RIP engines available, possibly because all of the RIP engines are busy with another job, program control of the RIP manager 14 waits in the loop comprised of steps 40, 60 and 80 until a RIP engine becomes available. When a RIP engine (or RIP engines) become available, the current number of available engines M is written into storage 100 for subsequent use.

In some embodiments, a page count is supplied by a user or a previous processing step, such as one of the processes performed on a PDL file. If the page count is not available, a RIP is queried in steps 130 about whether it can provide a page count. If a RIP supports fast page count, which is a process for obtaining a page count without RIPping an entire file, program control proceeds to step 135 where the page count is determined by the RIP.

At step 136, the RIP engine waits for a command to either find a page count or RIP a print job.

If at step 130, a RIP does not support fast page count, a determination is made at step 131 as to whether the print job 12 is of a type for which a page counting algorithm is known. Page counts for print jobs such as PDF files and post script files can be obtained by parsing the content of the respective files. Page counting algorithms for various file types are known to those of skill in the art. If a page counting algorithm is known, program control proceeds to step 140. If a page counting algorithm is not known or available, at step 132, the page count is determined by sampling the print job. Determining a page count by sampling a print job is a process by which a print job page count is estimated by taking into account any text and/or graphics in at least a portion of a print job and extrapolating what a total print job page count will be based upon the print job sample. A page count can also be provided by the customer, as part of the print job.

In step 140, the print job 12 is parsed in order to enable the determination of the job page count using the algorithm determined in step 131.

In step 160, the partition size is determined in part from the page count, and in part from a user-specification such as, a percentage of total page count, or a fixed partition size.

Returning to step 135, one or more of the "M" RIP engines receives an instruction from the RIP manager 14 to calculate the print job's actual page count. The RIP engine(s) that receive the instruction perform the task by reading a copy of the print job 12 and using either public or proprietary algorithms (at their discretion) to determine page count of print job 12 by executing step 121 (determining if a copy of the print job exists with the RIP engine(s) and step 122 (RIPping the print job to determine page count 122). The results of steps 121 and 122 (Pg, where Pg is the print job's total page count) is stored in memory at step 123.

If a copy of the print job 12 is not available to the RIP engine(s) 18 used to determine page count, a copy of the print job 12 is downloaded at step 124. The time required to transmit the print job 12 to the RIP engine(s) is measured and the running average of the network transmission time is calculated in step 124, and stored as $N_t$ in step 125.

The network transmission time $N_t$ stored in a database is initialized with a value by using heuristically derived data for the network being used. Over time, the value of $N_t$ is adjusted or modified by the network transmission time measured in step 124.

In step 170 the total partition count "X" is determined, and each partition is sequentially ordered by the RIP manager 14 by assigning to each partition a number indicating its relative position in the total set of partitions 16 that comprise the print job 12. Once the page count Pg and partition count X are determined, the RIP manager 14 instructs the M RIP engines (where "M" is an integer representing the number of available RIP engines) in step 180 to begin processing the first M partitions of the X total partitions of the partitioned print job 16. Each of the M, RIP engines 18 are assigned at least one partition of the first X partitions in the partitioned print job 16. Upon the RIP engines' receipt of the partitions, the RIP engines 18 create hardware ready bit output files (the formats of which are created by the RIP engines to make the HRB files understandable by the printers 22 to yield output printed pages 24).

In order to determine the number of print job partitions that need to be RIPped in advance of sending them to the printer 22 and then starting the printer 22 in order to keep the printer continuously printing, the RIP manager 14 needs to determine an average time required by each raster image processor to receive a print partition, and to create an HRB output file from that partition and to send the HRB output file to the printer 22 thereby creating samples of the time required to receive a partition, create an HRB output file and transfer it to the printer 22. Once the processing and transmission time average is calculated for each image processor, the number of partitions "Y" that must be preprocessed before any resulting HRB files are sent to the printer 22 can be determined using empirically determined formulas.

In FIG. 3, program control continues at step 190 from step 180 shown in FIG. 2. In step 190, a RIP engine waits for a command to raster image process (RIP) a partition. A determination is made at step 210, whether a local copy exists. If it's determined that no local copy exists, a copy is downloaded.

In step 210, the RIP engine downloads the print job 12 (i.e., obtains an electronic copy of the print job 12) from the print manager 14, which usually occurs via an appropriate data network between the print manager 14 and the RIP processors 18. The RIP engine measures the time required to obtain the print job 12 copy (i.e., the network transfer rate or network transfer time) and stores an updated average network transfer rate/time $N_t$ in a database.

If it's determined at step 201, that the RIP engine has a copy of the print job (i.e. a local copy) program control proceeds to step 220 where the RIP engine processes the partition, measures the time to RIP the partition, calculates an average RIP time and stores the updated partition RIP time in a memory location, $R_t$.

From step 220, program control passes to step 240 where the M RIP engines continue to process partitions. The different RIP engines process partitions as they become available until all of the partitions have been RIPped into an HRB output file for the printer 22.

Between step 220 and 240 is a program step 230, which simply indicates that after a first RIP engine processes the first partition in step 220, the other M engines are permitted to conclude in-process RIP tasks before they are re-tasked. When a RIP engine 18 finishes a partition, it can be made available to RIP a new partition in step 240.

In step 250 the RIP manager extracts, possibly from a local data base, the variables Rc, Rp, Pc, Pt, Po and Nt values needed to calculate the minimum number of partitions to be RIPped. The variable Pg is obtained from previous steps. The variable Fs is retrieved by examining the disk space used by print job 12.

In step 260, and as will be discussed subsequently in greater detail, the minimum number of print partitions that need to be RIPped before starting a printer 22 is calculated. When that number is determined, and that number "N" of partitions has been RIPped, in step 270, the first of the N-number of RIPped partitions can be sent to the printer 22 for printing.

Program execution can conclude at step 280.

Considering now in further detail the empirically determined formulas for calculating the total number N of RIP cycles to process by the RIP engines prior to printing, the methodology includes the step of processing the "N" partitions into HRB files by the RIP engines 18 and storing them either on a local storage device, or sending them to the printer 22 for storage without yet enabling the printer 22 to begin printing operations from the HRB output files.

Once the empirically determined, N-HRB files are prepared and sent to the printer 22, any remaining and unprocessed partitions in the amount of X–N remaining partitions are processed by the RIP engines until all of the partitions have been processed. The printer 22 can be initiated to begin printing output pages from the HRB files it has received or which are in local storage 20.

The variables that are used in the equations are listed in Table 1. Some of the constant values are derived empirically while others are calculated.

TABLE 1

| | | |
|---|---|---|
| R | The number of pages that have been RIPped and transferred to a print engine for a given time interval. | |
| Rc | The Rip Count, is the number of raster image processors available to process a given print job and is, determined by the RIP Manager during initialization by reading a configuration file or database setting as to the number of RIP engines available for processing print jobs; | Constant |
| R(t) | The total number of pages that have been RIPped and transferred to a print engine at a point in time. | |
| Rp | The RIP Page Time, the time to RIP a single page on average will be calculated by looking at the number of pages in each of the first partitions, then dividing the number of pages in each of the first few partitions by the time it took to process each partition, and then tracking this value over time, modifying it as each partition is processed from every job. | |
| Pc | The Partition Page Count, or number of pages in each partition, is a user-settable value that the RIP Manager will retrieve just before partitioning the job. Over time, if the RIP Manager detects that a majority of the partitions of a print job have to be processed before letting the press start working, then the page count is too high and should be reduced. Similarly, if the RIP Manager detects that too many partitions are being created, resulting in more overhead, then the partition page count values should be increased. | User settable. Recommend some % of total page count of the job. |

TABLE 1-continued

| | | |
|---|---|---|
| Pt | The Press Time constant can be determined by the RIP Manager at initialization time by recognizing the press type the HRB data is being prepared for, and using an attribute of that press type, being the number of pages per second the press can deliver if being fed sufficient HRB data. A 68 ppm press would have a value of 1.13 pages/second. | Constant |
| Pt(t) | The number of pages that can be printed by the press at a point in time. It is calculated using equations that follow. | |
| N | The number of RIP cycles to RIP before engaging the press. | Calculated using equations set forth below. |
| Po | Press Page size. Average press page size is found by looking at the output file size (disk space used) generated by the RIP Engine for a partition and dividing the size by the number of pages in the partition. Over time, this value will be updated according to new values for each partition as it is processed. The page press size is determined by processing a partition, updating the average, processing a partition, updating the average, etc | Empirical |
| Nt | Network transmission speed in Mbytes/second. This data value is continuously updated whenever an input file is downloaded to a RIP Engine or an output partition is transferred to a printing press. Measure the size of the file transferred and divide by the time it took to be delivered, then update the average recorded in a database of some sort. | |
| Ps | Press start time. After the RIP Engines have completed their first N partitions (RIPping and transferring), the printing press is ready to begin. The equation for calculating Ps is included below. | Calculated using equations to follow. |
| Fs | File size. The size of the incoming print job, in Mbytes. | Obtained by examining the disk space used by the incoming print job or other similar mechanism. |
| Pg | The total number of pages in the incoming print job. | Input to RIP server or discovered by looking at the input file. |

Figure 4:
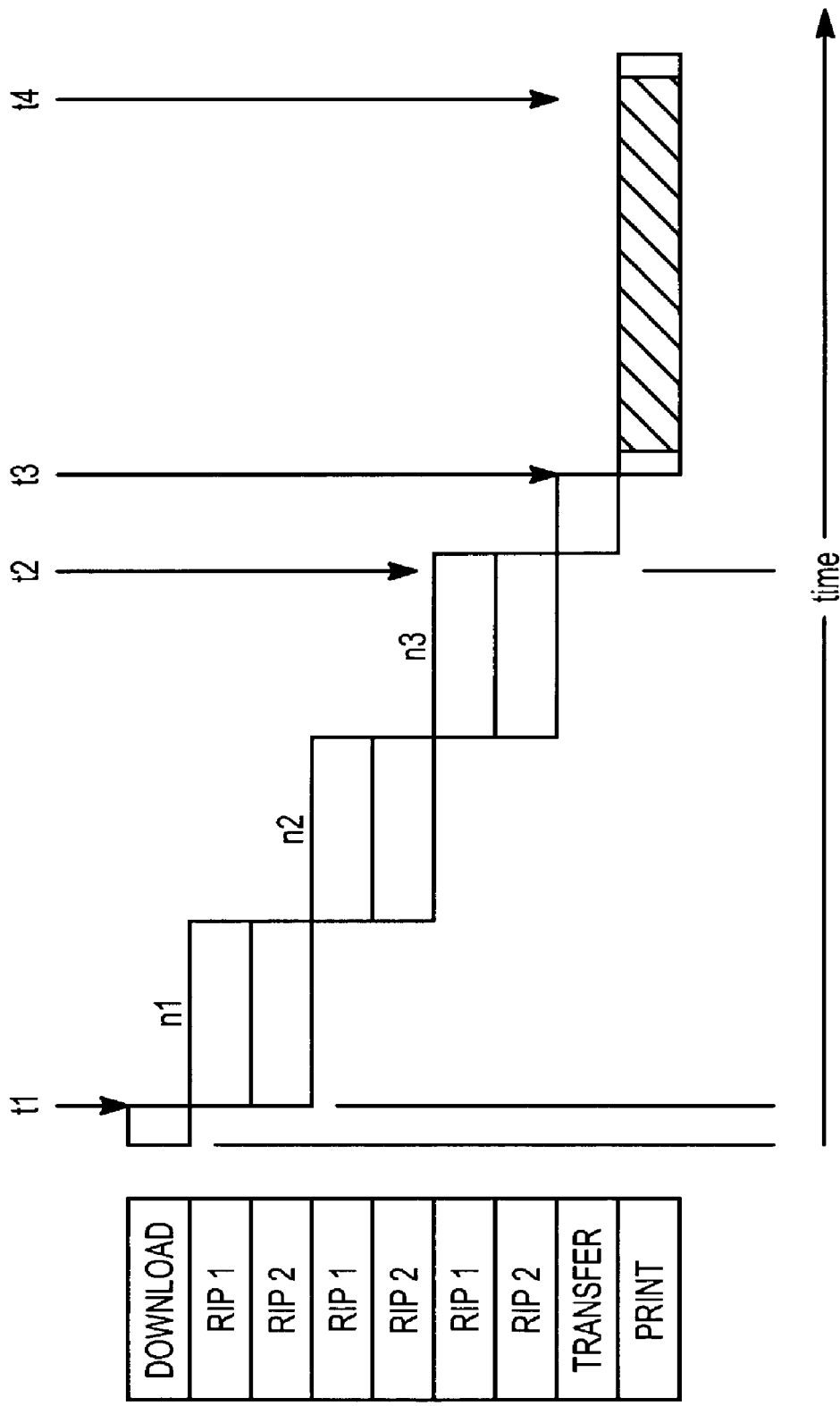
FIG. 4 depicts a timing diagram showing the flow of printing the first six partitions of an exemplary print job according to an embodiment of the present invention.

The sample timing diagrams in FIG. 4 show the flow of printing the first six partitions of a sample print job 12. Each partition 16 contains 200 pages (Pc=200), there are two RIP engines 18 (Rc=2) and there are three RIP cycles (N=3, n1, n2 and n3) which corresponds to 400 pages (Rc×Pc) being RIPped in each cycle for each RIP engine. A total of 1200 pages have been RIPped and have been transferred to the printer 22 for printing.

The diagram in FIG. 4 also shows the, time required to download a print job 12 to each of the RIP engines 18 (i.e. t1); the time required for the RIP engines 18 to RIP six partitions 16 using three RIP Cycles (N=3) (i.e., t2), the time it takes to transfer the resulting output from the RIP engines to the print engine 22 (i.e., t3), and the time it takes for the print engine 22 to actually create the output pages (i.e., t4).

The following equations show how we can calculate the minimum number of RIP cycles (N) to execute before letting the print engine 22 begin printing pages (allowing us to keep a print engine 22 continuously running even when the RIP engines 18 cannot supply enough hardware ready data at the same rate consumed by the print engine 22).

When the print job 12 arrives at the RIP Manager 14, time t is set to 0. The print engine 12 can start working at time Ps, the press start time:

$$Ps = \text{DownloadTime} + \textit{RIP}\text{time} + \text{TransferTime}$$

The DownloadTime is effectively the time (t1) it takes to download the entire file to the RIP engines. These calculations assume that the file is transmitted serially to only one RIP engine at a time.

$$\text{DownloadTime} = \frac{\text{FileSize} \cdot \text{RIPcount}}{\text{NetworkTransmissionSpeed}}$$

$$\text{DownloadTime} = \frac{Fs \cdot Rc}{Nt}$$

If multicast (network broadcast) capabilities are available, then the DownloadTime can be reduced to:

$$\text{DownloadTime} = \frac{\text{FileSize}}{\text{NetworkTransmissionSpeed}}$$

$$\text{DownloadTime} = \frac{Fs}{Nt}$$

The RIPtime is the time it takes each RIP engine 18 to RIP the pages in a partition 16 for each of the RIP cycles.

$$\textit{RIP}\text{time} = \textit{RIP}\text{cycles} \cdot \text{PartitionPageCount} \cdot \text{Time}\textit{RIP}\text{page}$$

$$\textit{RIP}\text{time} = N \cdot Pc \cdot Rp$$

The TransferTime is the time it takes to send all of the HRB files from the respective RIP engines 18 to the print engine 18. We have to count up the total number of pages that are going to be transferred, multiply by the average size of each page and divide by the network transmission time.

$$\text{TransferTime} = \textit{RIP}\text{cycles} \cdot \left( \frac{\text{PartitionPageCount} \cdot \text{RIPcount} \cdot \text{PageOutputSize}}{\text{NetworkTransmission}} \right)$$

$$\text{TransferTime} = N\left(\frac{Pc \cdot Rc \cdot Po}{Nt}\right)$$

Given the above equations, PressStartTime (Ps) can be determined according to the formula:

$$Ps = \left(\frac{Fs \cdot Rc}{Nt}\right) + N(Pc \cdot Rp) + N\left(\frac{Pc \cdot Rc \cdot Po}{Nt}\right)$$

$$Ps = \left(\frac{Fs \cdot Rc}{Nt}\right) + N\left(Pc \cdot Rp + \frac{Pc \cdot Rc \cdot Po}{Nt}\right)$$

Once the press starts printing, the total number of pages that have been printed can be calculated, assuming that the press maintains a non-empty input queue (if the input queue becomes empty, then the press will become idle, which is the situation we are trying to prevent) at all times.

The number of pages that could be printed by the press is represented by a linear equation. Noting that the press does not start until time Ps.

$$Pt(t) = (t-Ps)Pt;$$

$$t > Ps$$

R(t) is the number of pages that have been RIPped and transferred to the print engine 22. This is calculable according to a linear equation that depends on the average time to RIP an individual page and the time to transfer a single page from the RIP engine 18 to the print engine 22.

$$RIPTransferTime = PageCount \cdot PageRIPtime + \frac{PageCount \cdot RIPcount \cdot PressPageSize}{NetworkTransmissionSpeed}$$

$$RIPTransferTime = Pc \cdot Rp + \frac{Pc \cdot Rc \cdot Po}{Nt}$$

The time it takes to RIP and transfer the RIPped data can be determined. The number of pages that can RIPped in a given time interval can also be determined using another linear equation, which is the number of pages RIPped and transferred divided by the RIPTransferTime:

$$R = \frac{Pc \cdot Rc}{Pc \cdot Rp + \frac{Pc \cdot Rc \cdot Po}{Nt}}$$

$$R = \frac{Rc}{Rp + \frac{RcPo}{Nt}}$$

$$R(t) = \left(\frac{Rc}{Rp + \frac{RcPo}{Nt}}\right) t$$

This equation assumes that output data can be sent from the RIP engine 22 to the print engine 22 in a streamed mode (as the RIP outputs a byte of data, the output data is sent directly to the printer). If the RIP engines send data in a block form (e.g. where output data is not sent to the printer until the entire partition has been RIPped), the equation will be a sawtooth function. This would modify R(t) into:

$$R(t) = \left(\frac{Rc}{Rp + \frac{RcPp}{Nt}}\right) \cdot INT\left(\frac{t}{Pc \cdot Rp + \frac{Pc \cdot Rc \cdot Po}{Nt}}\right)$$

This can be reduced to a mathematically simpler equation (and a slightly conservative one in practice) by simply subtracting the number of pages that would normally be added to the print queue in a single RIP cycle instead of using the saw-tooth function. This results in a linear RIP time equation of:

$$R(t) = \left(\frac{Rc}{Rp + \frac{RcPo}{Nt}}\right) t - (Pc \cdot Rc)$$

For the following equation derivations we will assume a block transfer mechanism and use the above described mathematical simplification for R(t). The equation derivations for a streaming transfer mechanism would follow the same steps used in deriving the block transfer equations.

The most important part of keeping a digital printing press running continuously is to make sure that the Print Queue at the press never becomes empty. If this happens, the press "starves" and has to wait for the RIP engines to supply more print data. The number of pages in the print queue is equal to the number of pages that have been RIPped and delivered to the press (R(t)) minus the number of pages that have been printed (P(t)).

$$Q(t) = R(t) - Pt(t)$$

$$Q(t) = \left[\left(\frac{Rc}{Rp + \frac{RcPo}{Nt}}\right) t - (Pc \cdot Rc)\right] - [(t-Ps)Pt];$$

$$t > Ps$$

When Q(t)=0, the print queue is empty and the print press will stall. To ensure the press does not stall, the point in time t when at which the queue will be empty must be determined, as follows:

$$Q(t) = R(t) - P(t) = 0$$

$$Q(t) = \left[\left(\frac{Rc}{Rp + \frac{RcPo}{Nt}}\right) t - (Pc \cdot Rc)\right] - [(t-Ps)Pt] = 0$$

Now, with a substitution of α, β and γ to make it easier to solve for t, which tells us when the press will stall, yields:

$$\alpha = \frac{Rc}{Rp + \frac{RcPo}{Nt}};$$

$$\beta = PcRp + \frac{PcRcPo}{Nt};$$

$$\gamma = \frac{FsRc}{Nt};$$

$$\alpha t - PcRc = (t - (\gamma + N\beta))Pt$$

$$\alpha t - PcRc = tPt - \gamma Pt - N\beta Pt$$

$$\alpha t - tPt = PcRc - \gamma Pt - N\beta Pt$$

$$t(\alpha - Pt) = PcRc - \gamma Pt - N\beta Pt$$

$$t = \frac{PcRc - \gamma Pt - N\beta Pt}{(\alpha - Pt)}$$

$$t = \frac{PcRc - Pt(\gamma + N\beta)}{(\alpha - Pt)}$$

$$t = \frac{PcRc - Pt\left(\frac{FsRc}{Nt} + N\left(PcRp + \frac{PcRcPo}{Nt}\right)\right)}{\left(\frac{Rc}{Rp + \frac{RcPo}{Nt}} - Pt\right)}$$

Solving for N (the minimum number of RIP Cycles) is done as follows:

$$t = \frac{PcRc - Pt(\gamma + N\beta)}{(\alpha - Pt)}$$

$$t(\alpha - Pt) = PcRc - Pt\gamma - PtN\beta$$

$$PtN\beta = PcRc - Pt\gamma - t(\alpha - Pt)$$

$$N = \frac{PcRc - Pt\gamma - t(\alpha - Pt)}{Pt\beta}$$

$$N = \frac{PcRc - Pt\left(\frac{FsRc}{Nt}\right) - t\left(\frac{Rc}{Rp + \frac{RcPo}{Nt}} - Pt\right)}{Pt\left(PcRp + \frac{PcRcPo}{Nt}\right)}$$

Given that t is the time when the press will starve from lack of input data to process, t should occur only when all of the pages of the input job have been RIPped and transferred to the printing press. With Pg being the total number of pages in the input job and Ps being the time when the press actually started to print, $$Pg = (t - Ps)Pt$$

$$t = \frac{Pg}{Pt} + Ps$$

$$t = \frac{Pg}{Pt} + \left(\frac{FsRc}{Nt} + N\left(PcRp + \frac{PcRcPo}{Nt}\right)\right)$$

Now, having two equations with two unknowns (t and N), the other variables are typically constants that will be known before the printing operation begins. Plugging this last equation into the equation for N yields a single equation with only a single unknown:

$$N = \frac{PcRc - Pt\left(\frac{FsRc}{Nt}\right) - \left(\frac{Pg}{Pt} + \left(\frac{FsRc}{Nt} + N\left(PcRp + \frac{PcRcPo}{Nt}\right)\right)\right)\left(\frac{Rc}{Rp + \frac{RcPo}{Nt}} - Pt\right)}{Pt\left(PcRp + \frac{PcRcPo}{Nt}\right)}$$

Again substituting the more complex terms results in:

$$N = \frac{PcRc - Pt(\gamma) - \left(\frac{Pg}{Pt} + (\gamma + N(\beta))\right)(\alpha - Pt)}{Pt(\beta)}$$

$$NPt\beta = PcRc - Pt(\gamma) - \frac{Pg}{Pt}(\alpha - Pt) - \gamma(\alpha - Pt) - N\beta(\alpha - Pt)$$

$$NPt\beta + N\beta(\alpha - Pt) = PcRc - Pt(\gamma) - \frac{Pg}{Pt}(\alpha - Pt) - \gamma(\alpha - Pt)$$

$$N\beta\alpha = PcRc - Pt(\gamma) - \frac{Pg}{Pt}(\alpha - Pt) - \gamma(\alpha - Pt)$$

$$N = \frac{PcRc - Pt(\gamma) - \frac{Pg}{Pt}(\alpha - Pt) - \gamma(\alpha - Pt)}{\alpha\beta}$$

$$N = \frac{PcRc - Pt(\gamma) - \frac{Pg}{Pt}\alpha + Pg - \gamma\alpha + \gamma Pt}{\alpha\beta}$$

$$N = \frac{PcRc - \alpha\gamma + Pg\left(1 - \frac{\alpha}{Pt}\right)}{\alpha\beta}$$

$$N = \frac{PcRc - \left(\frac{Rc}{Rp + \frac{RcPo}{Nt}}\right)\left(\frac{FsRc}{Nt}\right) + Pg\left(1 - \frac{Rc}{\left(Rp + \frac{RcPo}{Nt}\right)Pt}\right)}{\left(\frac{Rc}{Rp + \frac{RcPo}{Nt}}\right)\left(PcRp + \frac{PcRcPo}{Nt}\right)}$$

The following example, using the constants in Table 2 and the equations derived above, demonstrates that a press can be kept continually running even though the RIP engines 18 cannot produce data as fast as the print engine 22 can consume the data.

TABLE 2

| | |
|---|---|
| Rc | 3 RIP Engines |
| Rp | 2.8 seconds/page (average) |
| Pc | 20 pages/partition |
| Pt | 1.13 pages/second (68 ppm) |
| Po | 10 MBytes/page (average) |
| Nt | 35 Mbytes/second (average) |
| Fs | 12 Mbytes |
| Pg | 468 pages |

$$N = \frac{PcRc - \alpha\gamma + Pg\left(1 - \frac{\alpha}{Pt}\right)}{\alpha\beta}$$

$$\alpha = \frac{3}{2.8 + \frac{3 \cdot 10}{35}} = 0.8$$

TABLE 2-continued $$\beta = 20 \cdot 2.8 + \frac{20 \cdot 3 \cdot 10}{35} = 73.1$$

$$\gamma = \frac{12 \cdot 3}{35} = 1.0$$

$$N = \frac{20 \cdot 3 - (0.8)(1.0) + 468\left(1 - \frac{0.8}{1.13}\right)}{(0.8)(73.1)} = 3.3$$

Rounding, we end up with:

N=3

Therefore, if at least 3 RIP cycles are performed before engaging the press, the press will not be starved.

Considering now the timing diagrams in FIG. 5, the diagrams depict the flow of activity between the RIP engines and the printing press for a initial RIP Cycle value of 3, where the press does not starve, and a value of 2, where the press does starve. The document to be printed has 468 total pages. As shown on the timeline, R(t) is the number of pages that have been RIPped and delivered to the printing press at time t. P(t) is the number of pages that have been printed by the printing press at time t.

The RIP Cycle (N) value is based on the assumption that the Rp, Po, and Nt system averages are applicable for the current job. After processing the N partitions before the press is started, job specific Rp', Po', and Nt' values can be used to calculate N' (a job specific N) to see if the original N value is sufficient. If not, then the RIP Manager will make sure N'−N additional partitions are RIPped and transferred to the printing press before telling the printing press to commence work.

Another modification would be to have the RIP Engines start working on a new partition as soon as it has finished one and not wait for the transfer step to complete. This has implications with overwhelming the local file system and will cause the above formulas to be modified slightly.

What is claimed is:

1. A method of processing a print job by a predetermined number of raster image processors M to operate a printer for the duration of the print job comprising:
   partitioning the print job into X partitions;
   preprocessing into a printer-ready output, a plurality of partitions Y where Y is a subset number of the X partitions prior to printing, the preprocessing performed by a plurality of the M raster image processors;
   after the preprocessing the Y partitions, sending the printer-ready output for the Y partitions to the printer and initiating operation of the printer;
   processing into printer-ready output, the remaining X−Y partitions concurrent with the printing, the processing being performed by at least one of the M processors; and
   sending the printer-ready output for the X−Y partitions to the printer;
   wherein the method further comprises calculating the number of partitions in the subset Y according to a formula expressed as $$N = \frac{PcRc - \alpha\gamma + Pg\left(1 - \frac{\alpha}{Pt}\right)}{\alpha\beta}$$

where:
   N is the number of RIP cycles to RIP before engaging the printer or press in order to be able to keep a printer running continuously after starting, until the print job is completed;
   Pc is the partition page count;
   Rc is the RIP Count;

$$\alpha = \frac{Rc}{Rp + \frac{RcPo}{Nt}};$$

$$\beta = PcRp + \frac{PcRcPo}{Nt};$$

$$\gamma = \frac{FsRc}{Nt};$$

Rp is the RIP page time;
   Pg is the total number of pages of the print job;
   Pt is the press time constant;
   Fs is the file size, in megabytes;
   Po is the press page size;
   Nt is the network transmission speed.

2. The method of claim 1, further comprising:
   calculating the number of partitions in the subset Y according to a predefined formula based on
   a download time to send the print job to the M raster image processors,
   a raster image processor cycle time to produce the printer-ready output for one of the partitions with one of the raster image processors, and
   a transfer time to send all of the printer-ready output to the printer.

3. A method of processing print job image data by a predetermined number of raster image processors M, to operate a printer continuously for the duration of the print job comprising the steps of:
   determining print job partitions and a total partition count X, wherein determining includes determining a print job page count using at least one raster image processor;
   processing a predetermined number of partitions into a plurality of M, hardware ready bit (HRB) output files and transferring said M, HRB output files to the printer;
   using a predetermined formula, calculating a plurality number of partitions Y, to preprocess by said M processors, before sending resultant Y HRB output files to said printer, where Y is a subset of the X partitions;
   preprocessing said Y partitions using a plurality of said M, raster image processors;
   after the preprocessing the Y partitions, transferring the resultant Y HRB output files to the printer;
   processing the remaining X−Y partitions into, HRB files by at least one of said M processors, if any, until all partitions have been processed.

4. The method of claim 3 wherein said step of determining the print job partitions is comprised of the step of determining a print job page count using a page counting algorithm.

5. The method of claim 3 wherein said step of determining the print job partitions is comprised of the step of determining a print job page count from a customer.

6. A method of processing print job image data to fully utilize a printer using multiple raster image processors comprising the steps of:
   sending an unprocessed print job to M, raster image processors (processors);
   determining the print job page count; determining a print job partition, and a total partition count X, and sequentially numbering each partition;
   assigning to each of said M processors, at least one partition of the first M partitions (hereafter the "M partitions:");
   processing the M partitions into M, hardware ready bit (HRB) output files;
   transferring each HRB output file to said printer;
   determining the time required by each processor to:
   receive the print job;
   create an HRB output file and send each HRB output file to the printer thereby creating M samples of the time required to: receive a partition, create a HRB file and transfer the created HRB file to a printer;
   calculating an average time for a raster image processor to: receive a page, process a page and transfer a page;

using at least one predetermined formula, calculating the total number of partitions Y, to process by said M processors, before sending resultant HRB output files to said printer;
processing the X–Y partitions into HRB output files and transferring the files to said printer;
processing X–Y remaining partitions into X–Y, HRB files by at least one of said M processors, if any, until all partitions have been processed.

7. The method of claim 6 wherein said step of determining the print job page count is comprised of the step of determining the print job page count using a single raster image processor.

8. The method of claim 6 further including the step of: printing said Y, HRB files in sequential order, after the step of transferring the files to said printer.

9. The method of claim 6 further including the step of transferring said X–Y remaining HRB files to said printer.

10. The method of claim 6 further including the step of: establishing that the printer has printed output from at least one, HRB file.

11. A method of processing print job image data for a printer using multiple raster image processors in order to be able to start said printer printing for said print job and continuously run said printer until said print job is completed comprising the steps of:
determining a print job page count;
determining a print job partition size and partition count, Y and numbering each partition;
allocating to M, separate raster image processors, the first M partitions of said Y partitions of the print job;
processing each of the M partitions into hardware ready bit (HRB) output files;
transferring each HRB output file from each processor to said printer;
using at least one predetermined formula, determining a total number of partitions X to process by said M processors before sending processed partitions to said printer in order to be able to start said printer printing for said print job and continuously run said printer until said print job is completed;
processing X partitions by said M processors, and transferring the processed X partitions to said printer to begin printing said print job;
processing one or more remaining partitions, if any, by said M processors until all Y partitions have been processed.

12. The method of claim 11 including the steps of:
determining the time required by each processor to process it's partition and the time required to send each output HRB file to the printer thereby creating M time samples required for each processor to: receive a partition, create a HRB file and transfer the created HRB file to a printer;
calculating an average time for a processor to: receive a page, process a page and transfer a page;
including in said at least one predetermined formula, the average time for a processor to receive a page, process a page and transfer a page.

13. The method of claim 12 including the steps of:
sending the print job to a plurality of M, raster image processors (processors);
determining the time required to send said print job to said processors.

14. A method of processing print job image data for a printer using multiple raster image processors comprising the steps of:
determining a number of pages in a print job;
determining a print job partition size;
determining a number of partitions into which said print job can be divided, each of said partitions being sequentially numbered;
determine the number of raster image processors, M, available to process raster image print data;
allocating to said M processors, the first M partitions of said print job;
processing each partition by each processor;
transferring each raster image print data output file from said M processors to said printer;
determining the time required for each raster image processor to process the partition that it received;
determining the time required for each raster image processor to send its output file to the printer thereby creating M samples of the time required for each raster image processor to: receive a partition, process a partition and transfer a processed partition to a printer;
calculating an average time to receive a page, process a page and transfer a page, by each processor of said M processors;
calculate the number of partitions X, to process by said M processors using predetermined formulae;
processing X partitions by said M processors, and transferring the processed X partitions to said printer to begin printing said print job;
processing one or more remaining partitions, if any, by said M processors until all of the determined number of partitions have been processed.

15. The method of claim 14 including the steps of:
sending a copy of a print job to each raster image processor of a plurality of raster image processors;
determining the time required to send said copy to all of said raster image processors.

16. A system for processing print job image data by M, raster image processors comprising:
at least one raster image processor, which determines print job partitions and a total partition count X, and which also processes a predetermined number of partitions into M, hardware ready bit (HRB) output files and also transfers said M, HRB output files to the printer;
a raster image processor manager coupled to said at least one raster image processor and which calculates the total number of partitions Y, to process by said M processors and then sending said Y, resultant HRB output files to said printer;
said at least one raster image processor additionally processing said Y partitions using said M, raster image processors and processing the remaining partitions into, HRB files by at least one of said M processors, if any, until all partitions have been processed.

17. Computer storage media storing computer program instructions for performing the steps of a method of processing print job image data by M, raster image processors to operate a printer continuously for the duration of the print job, said method comprising the steps of:
determining print job partitions and a total partition count X, wherein determining includes determining a print job page count using at least one raster image processor;
processing a predetermined number of partitions into a plurality of M, hardware ready bit (HRB) output files and transferring said M, HRB output files to the printer;
using a predetermined formula, calculating a plurality number of partitions Y, to preprocess by said M processors, before sending resultant Y HRB output files to said printer, where Y is a subset of the X partitions;
preprocessing said Y partitions using a plurality of said M, raster image processors;
after the preprocessing the Y partitions, transferring the resultant Y HRB output files to the printer;

processing the remaining X−Y partitions, if any, into HRB files by at least one of said M processors until all partitions have been processed.

* * * * *

UNITED STATES PATENT AND TRADEMARK OFFICE
CERTIFICATE OF CORRECTION

PATENT NO. : 7,202,964 B2 Page 1 of 1
APPLICATION NO. : 10/192226
DATED : April 10, 2007
INVENTOR(S) : Robert Douglas Christiansen It is certified that error appears in the above-identified patent and that said Letters Patent is hereby corrected as shown below:

In column 10, line 35, insert $$-- \left[\left(\frac{Rc}{Rp+\frac{RcPo}{Nt}}\right)t - (PcRc)\right] = \left(t - \left(\frac{FsRc}{Nt} + N\left(PcRp + \frac{PcRcPo}{Nt}\right)\right)\right)Pt \; --,$$

below "$Q(t) = \left[\left(\frac{Rc}{Rp+\frac{RcPo}{Nt}}\right)t - (PcRc)\right] - [(t-Ps)Pt] = 0$".

Signed and Sealed this

Twenty-first Day of October, 2008

JON W. DUDAS
*Director of the United States Patent and Trademark Office*